United States Patent
Xie (10) Patent No.: US 8,549,765 B2
(45) Date of Patent: Oct. 8, 2013

(54) MEASURING TOOL AND MEASURING METHOD THEREOF

(75) Inventor: Fu-Qin Xie, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 180 days.

(21) Appl. No.: 13/335,904

(22) Filed: Dec. 22, 2011

(65) Prior Publication Data

US 2012/0317827 A1  Dec. 20, 2012

(30) Foreign Application Priority Data

Jun. 20, 2011  (CN) .......................... 2011 1 0165400

(51) Int. Cl.
*G01B 5/20*  (2006.01)
(52) U.S. Cl.
USPC .............................................. 33/549; 33/833
(58) Field of Classification Search
USPC ............................ 33/548, 549, 555, 832, 833
See application file for complete search history.

(56) References Cited

U.S. PATENT DOCUMENTS

| 3,639,994 | A | * | 2/1972 | Palmenberg .................... 33/555 |
| 4,805,310 | A | * | 2/1989 | Fernand .......................... 33/832 |
| 5,375,341 | A | * | 12/1994 | College et al. .................. 33/555 |
| 5,497,559 | A | * | 3/1996 | Okumura et al. ............... 33/833 |
| 6,026,583 | A | * | 2/2000 | Yoshizumi et al. ............. 33/549 |

FOREIGN PATENT DOCUMENTS

TW  I332551  11/2010

* cited by examiner

*Primary Examiner* — G. Bradley Bennett
(74) *Attorney, Agent, or Firm* — Winston Hsu; Scott Margo (57) ABSTRACT

A measuring tool includes a tool body and a first measuring unit. The first measuring unit includes a first probe, a first measuring meter, and a first zero button. The first probe is used for contacting a standard part or a test part inside the tool body. The first measuring meter is connected to the first probe for displaying a first zero value or a first measure value. The first zero button is used for zeroing the first measuring meter to display the first zero value when the first probe contacts the standard part. When the first probe contacts the test part after the first measuring meter is zeroed, the first measuring meter displays the first measure value. A first dimension difference value of the test part and the standard part is equal to a difference value of the first measure value and the first zero value.

13 Claims, 8 Drawing Sheets

MEASURING TOOL AND MEASURING METHOD THEREOF

BACKGROUND OF THE INVENTION

1. Field of the Invention

The present invention relates to a measuring tool and a measuring method thereof, and more specifically, to a measuring tool for measuring a dimension difference value of a standard part and a test part and a measuring method thereof.

2. Description of the Prior Art

In general, a conventional method for measuring whether a test part has a correct size involves utilizing a test block. The test block has a containing space therein conforming to a size of a standard part. Thus, if the test part fits the containing space, it means that the test part has a correct size. However, in this method, since a user can not know a dimension difference value of the test part and the standard part, the user can not calibrate the size of the test part precisely if the test part has an incorrect size. Although the said problem can be solved by utilizing a measuring meter (e.g. a vernier caliper) to display sizes of the test part and the standard part, it may additionally result in a time-consuming and strenuous measuring process.

SUMMARY OF THE INVENTION

Thus, an objective of the present invention is to provide a measuring tool for measuring a dimension difference value of a standard part and a test part and a measuring method thereof, so as to solve the aforesaid problems.

The present invention provides a measuring tool for measuring a dimension difference value of a standard part and a test part. The measuring tool includes a tool body and a first measuring unit. The tool body has a containing space for containing the standard part or the test part. The first measuring unit is disposed at the tool body corresponding to a first axis. The first measuring unit includes a first probe, a first measuring meter, and a first zero button. The first probe protrudes inward relative to the containing space and is movable elastically along the first axis. The first probe is used for contacting the standard part when the standard part is disposed inside the tool body and for contacting the test part when the test part is disposed inside the tool body. The first measuring meter is connected to the first probe for displaying a first zero value or a first measure value corresponding to the test part. The first zero button is disposed on the first measuring meter for zeroing the first measuring meter to display the first zero value when the first probe contacts the standard part. When the first probe contacts the test part after the first zero button zeros the first measuring meter, the first measuring meter displays the first measure value. A first dimension difference value of the test part and the standard part at the first axis is equal to a difference value of the first measure value and the first zero value.

According to the claimed invention, the first measuring meter displays the first zero value and the first measure value in an analog display or a digital display manner.

According to the claimed invention, the first axis corresponds to an X-axis of the tool body.

According to the claimed invention, the measuring tool further includes a second measuring unit disposed at the tool body corresponding to a second axis. The second measuring unit includes a second probe, a second measuring meter, and a second zero button. The second probe protrudes inward relative to the containing space and movable elastically along the second axis, for contacting the standard part when the standard part is disposed inside the tool body and for contacting the test part when the test part is disposed inside the tool body. The second measuring meter is connected to the second probe for displaying a second zero value or a second measure value corresponding to the test part. The second zero button is disposed on the second measuring meter for zeroing the second measuring meter to display the second zero value when the second probe contacts the standard part. The second measuring meter displays the second measure value when the second probe contacts the test part after the second zero button zeros the second measuring meter, and a second dimension difference value of the test part and the standard part in the second axis is equal to a difference value of the second measure value and the second zero value.

According to the claimed invention, the second axis corresponds to a Y-axis of the tool body.

According to the claimed invention, the measuring tool further includes a third measuring unit disposed at the tool body corresponding to a third axis. The third measuring unit includes a third probe, a third measuring meter, and a third zero button. The third probe protrudes inward relative to the containing space and movable elastically along the third axis, for contacting the standard part when the standard part is disposed inside the tool body and for contacting the test part when the test part is disposed inside the tool body. The third measuring meter is connected to the third probe for displaying a third zero value or a third measure value corresponding to the test part. The third zero button is disposed on the third measuring meter for zeroing the third measuring meter to display the third zero value when the third probe contacts the standard part. The third measuring meter displays the third measure value when the third probe contacts the test part after the third zero button zeros the third measuring meter, and a third dimension difference value of the test part and the standard part at the third axis is equal to a difference value of the third measure value and the third zero value.

According to the claimed invention, the third axis corresponds to a Z-axis of the tool body.

According to the claimed invention, the tool body includes an upper cover and a lower cover. The lower cover is pivotally connected to a side of the upper cover for forming the containing space cooperatively with the upper cover.

According to the claimed invention, the first measuring unit and the third measuring unit are disposed at the upper cover corresponding to the first axis and the third axis respectively, and the second measuring unit is disposed at the lower cover corresponding to the second axis.

According to the claimed invention, the tool body includes an upper cover and a lower cover. The lower cover is pivotally connected to a side of the upper cover for forming the containing space cooperatively with the upper cover.

The present invention further provides a measuring method for utilizing a measuring tool to measure a dimension difference value of a standard part and a test part. The measure tool includes a tool body and a first measuring unit. The tool body has a containing space for containing the standard part or the test part. The first measuring unit is disposed at the tool body corresponding to a first axis. The measuring method includes disposing the standard part inside the containing space, contacting the standard part by the first measuring unit along the first axis, displaying a first zero value by the first measuring unit after being zeroed, disposing the test part inside the containing space, and contacting the test part by the first measuring unit along the first axis for displaying a first measure value corresponding to the test part. A first dimension difference value of the test part and the standard part in the first axis is equal to a difference value of the first measure value and the first zero value.

According to the claimed invention, the measuring tool further includes a second measuring unit disposed at the tool body corresponding to a second axis. The measuring method further includes contacting the standard part by the second measuring unit along the second axis, displaying a second zero value by the second measuring unit after being zeroed, and contacting the test part by the second measuring unit along the second axis for displaying a second measure value corresponding to the test part. A second dimension difference value of the test part and the standard part at the second axis is equal to a difference value of the second measure value and the second zero value.

According to the claimed invention, the measuring tool further includes a third measuring unit disposed at the tool body corresponding to a third axis. The measuring method further includes contacting the standard part by the third measuring unit along the third axis, displaying a third zero value by the third measuring unit after being zeroed, and contacting the test part by the third measuring unit along the third axis for displaying a third measure value corresponding to the test part. A third dimension difference value of the test part and the standard part at the third axis is equal to a difference value of the third measure value and the third zero value.

In summary, the present invention utilizes the measuring unit disposed on the tool body capable of containing a standard part or a test part, to display a zero value when the probe contacts the standard part and then display a measure value when the probe contacts the test part. Accordingly, a dimension difference value of the test part and the standard part can be calculated based on the difference value of the measure value and the zero value. In such a manner, the measuring tool provided by the present invention can precisely determine whether the size of the test part fits the size of the standard part. Furthermore, since there is no need to utilize an additional measuring tool, the present invention can also avoid a time-consuming and strenuous measuring process.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
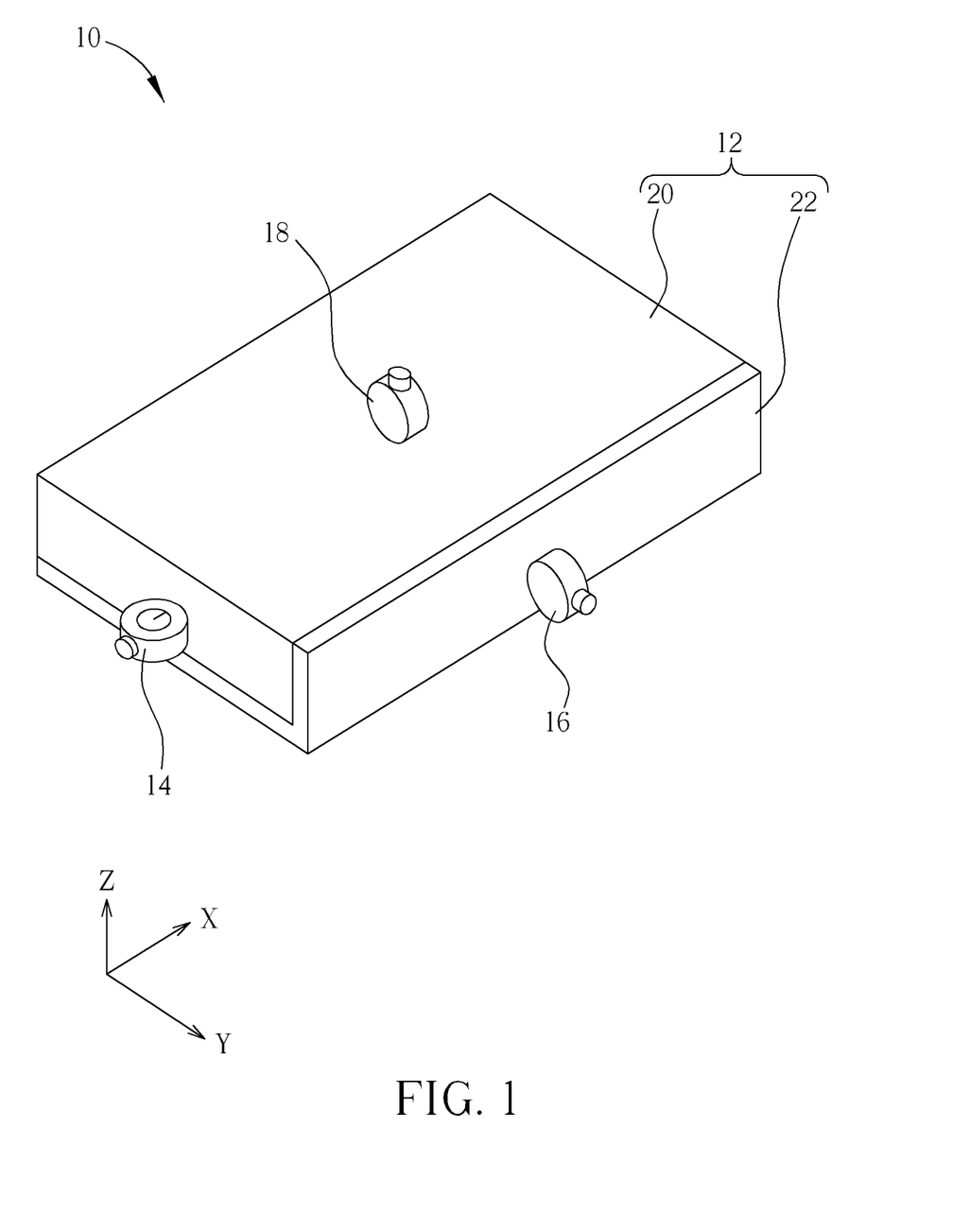
FIG. 1 is a folded diagram of a measuring tool according to an embodiment of the present invention.
Figure 2:
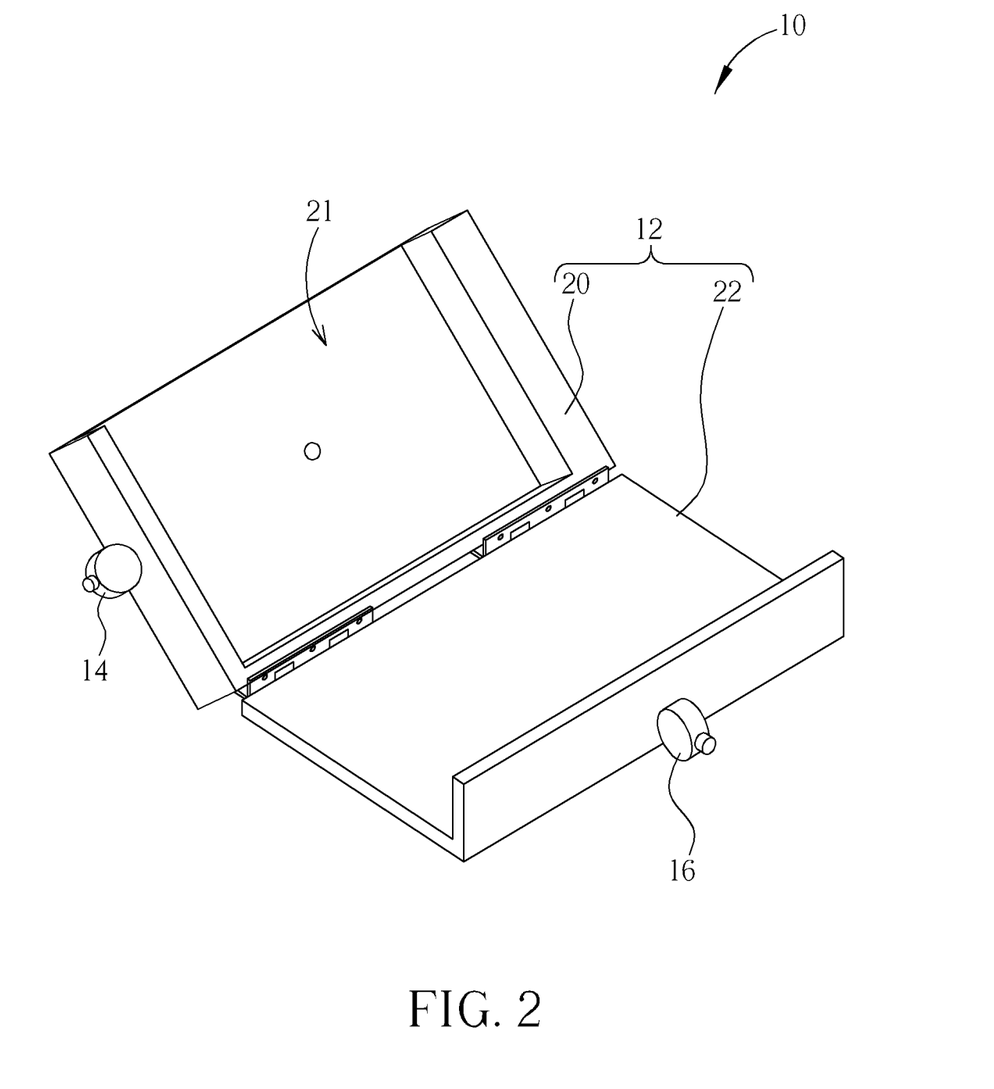
FIG. 2 is an expanded diagram of the measuring tool in FIG. 1.

Please refer to FIG. 1 and FIG. 2. FIG. 1 is a folded diagram of a measuring tool 10 according to an embodiment of the present invention. FIG. 2 is an expanded diagram of the measuring tool 10 in FIG. 1. As shown in FIG. 1 and FIG. 2, the measuring tool 10 includes a tool body 12, a first measuring unit 14, a second measuring unit 16, and a third measuring unit 18. In this embodiment, the tool body 12 includes an upper cover 20 and a lower cover 22. The lower cover 22 is pivotally connected to a side of the upper cover 20 for forming a containing space 21 cooperatively with the upper cover 20.

Figure 3:
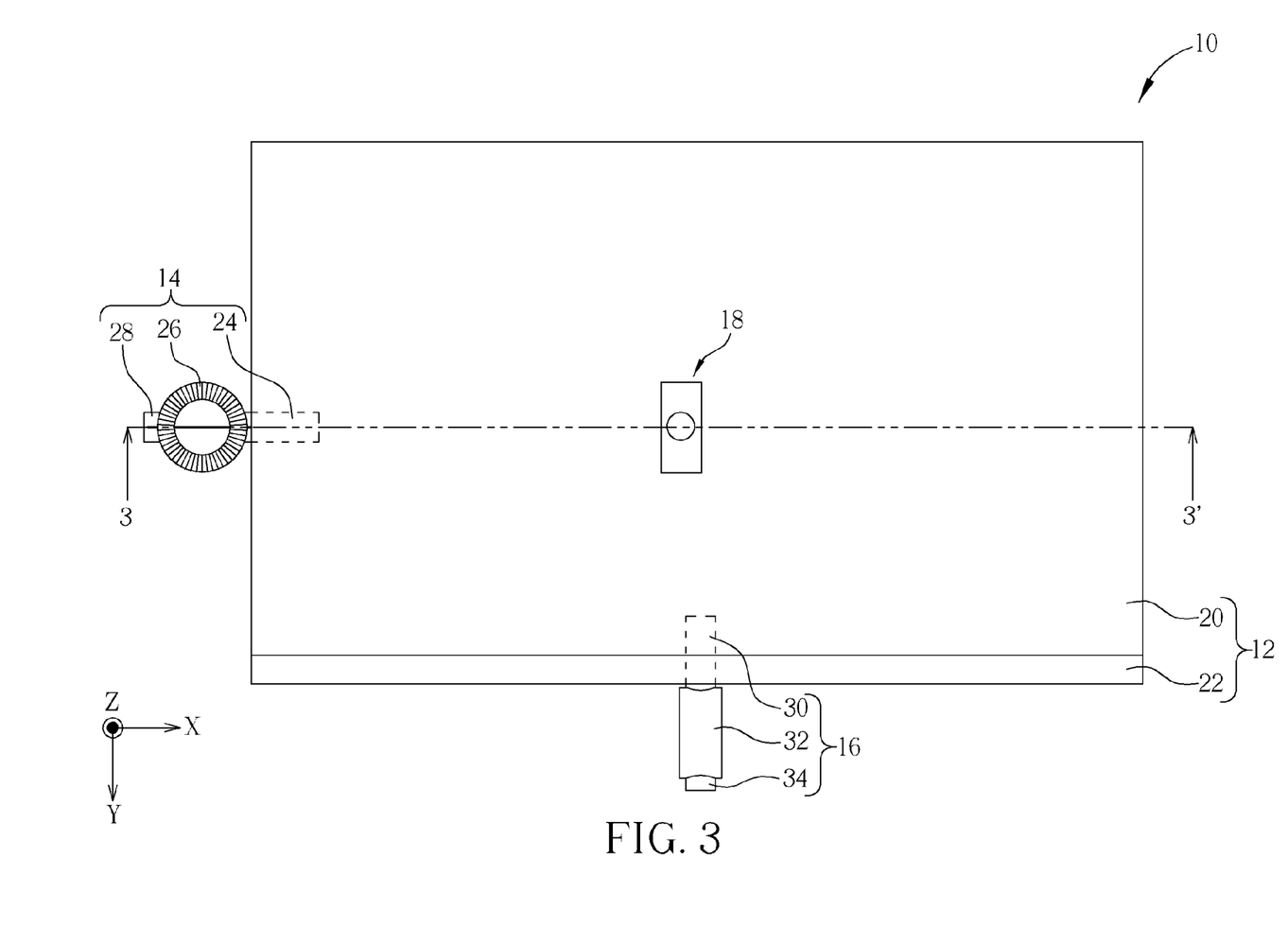
FIG. 3 is a top view of the measuring tool in FIG. 1.
Figure 4:
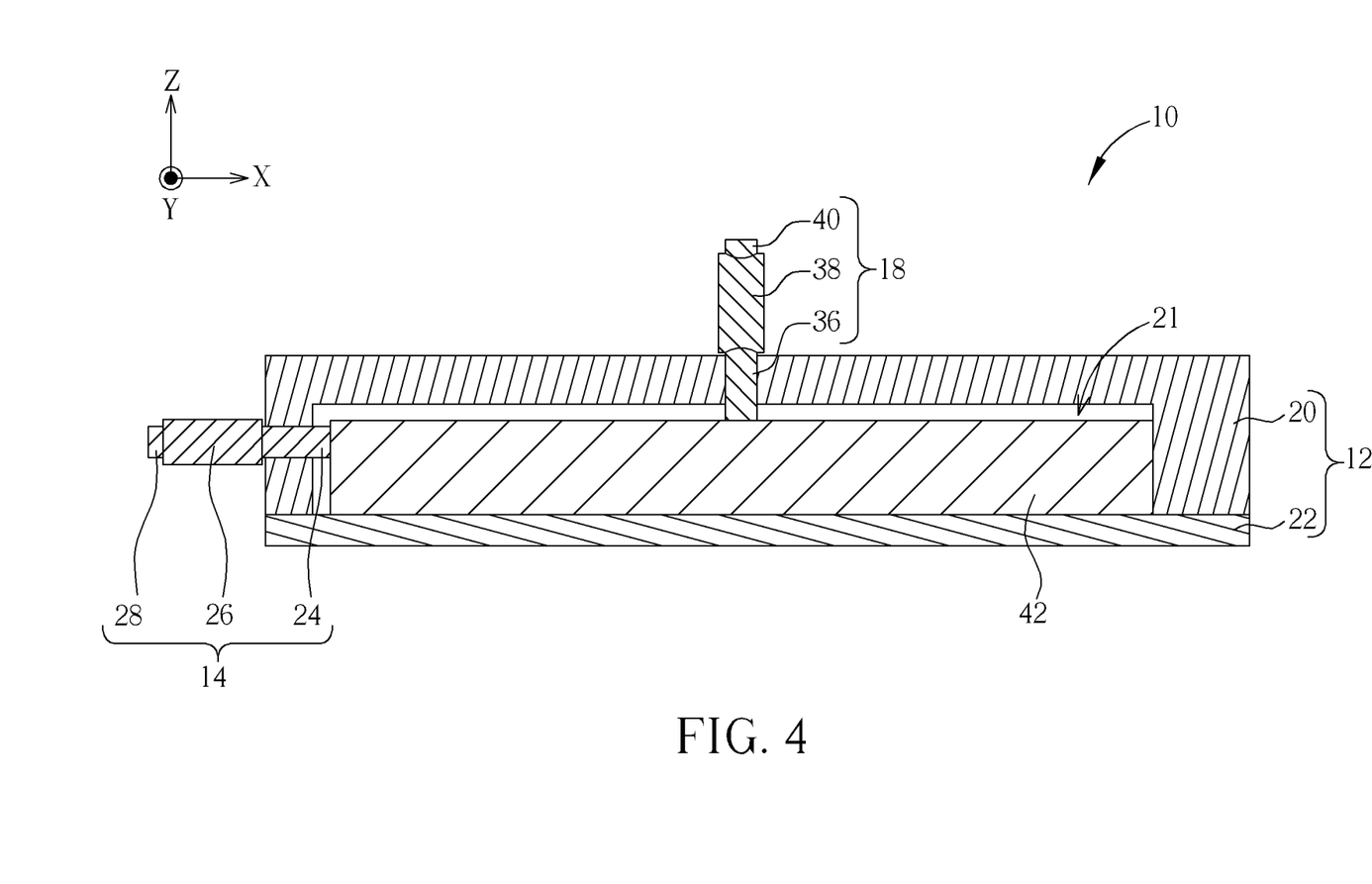
FIG. 4 is a sectional view of the measuring tool in FIG. 3 along a sectional line 3-3'.

The mechanical designs of the first measuring unit 14, the second measuring unit 16, and the third measuring unit 18 are described in detail herein. Please refer to FIG. 3 and FIG. 4. FIG. 3 is a top view of the measuring tool 10 in FIG. 1. FIG. 4 is a sectional view of the measuring tool 10 in FIG. 3 along a sectional line 3-3'. As shown in FIG. 3 and FIG. 4, the first measuring unit 14 is disposed on the tool body 12 corresponding to a first axis of the tool body 12. In this embodiment, the first measuring unit 14 is disposed on the upper cover 20 corresponding to an X-axis in FIG. 3, but is not limited thereto. The first measuring unit 14 includes a first probe 24, a first measuring meter 26, and a first zero button 28.

The first probe 24 protrudes inward relative to the containing space 21 and is movable elastically along the first axis (i.e. the X-axis in FIG. 3). In this embodiment, elastic movement of the first probe 24 can be achieved by connecting to a spring. When a standard part or a test part is disposed inside the containing space 21, the first probe 24 is used for contacting the standard part or the test part.

The first measuring meter 26 is connected to the first probe 24 for displaying the first zero value or the first measure value corresponding to the test part. The first measuring meter 26 is a conventional measuring meter, such as a micrometer.

The first zero button 28 is disposed on the first measuring meter 26 for zeroing the first measuring meter 26 to display the first zero value when the first probe 24 contacts a standard part. As for the linkage design that the first probe 24 drives the first measuring meter 26 to measure and the zeroing design that the first zero button 28 zeros the first measuring meter 26, they are commonly seen in the prior art, such as utilizing a spring to connect the first probe 24 to the first measuring meter 26 for driving the pointer of the first measuring meter 26 to indicate a corresponding measure value when the spring is extended or compressed.

Furthermore, as shown in FIG. 3 and FIG. 4, the second measuring unit 16 is disposed on the tool body 12 corresponding to the second axis of the tool body 12. In this embodiment, the second measuring unit 16 is preferably disposed on the lower cover 22 corresponding to a Y-axis in FIG. 3, but is not limited thereto. The third measuring unit 18 is disposed on the tool body 12 corresponding to the third axis of the tool body 12. In this embodiment, the third measuring unit 18 is preferably disposed on the upper cover 20 corresponding to a Z-axis in FIG. 3, but is not limited thereto.

In this embodiment, the mechanical designs of the second measuring unit 16 and the third measuring unit 18 are the same as the mechanical design of the first measuring unit 14. In brief, the second measuring unit 16 includes a second probe 30, a second measuring meter 32, and a second zero button 34, and the third measuring unit 18 includes a third probe 36, a third measuring meter 38, and a third zero button 40. As for related description of the said components, it can be reasoned according to the aforementioned description of the first measuring unit 14 and therefore be omitted herein.

More detailed description for operations of the measuring tool 10 is provided as follows. Please refer to FIG. 5, which is a flowchart of a measuring method for utilizing the measuring tool 10 in FIG. 1 to measure a dimension difference value of a standard part and a test part in the first axis of the tool body 12 according to an embodiment of the present invention. The method includes the following steps.

Figure 5:
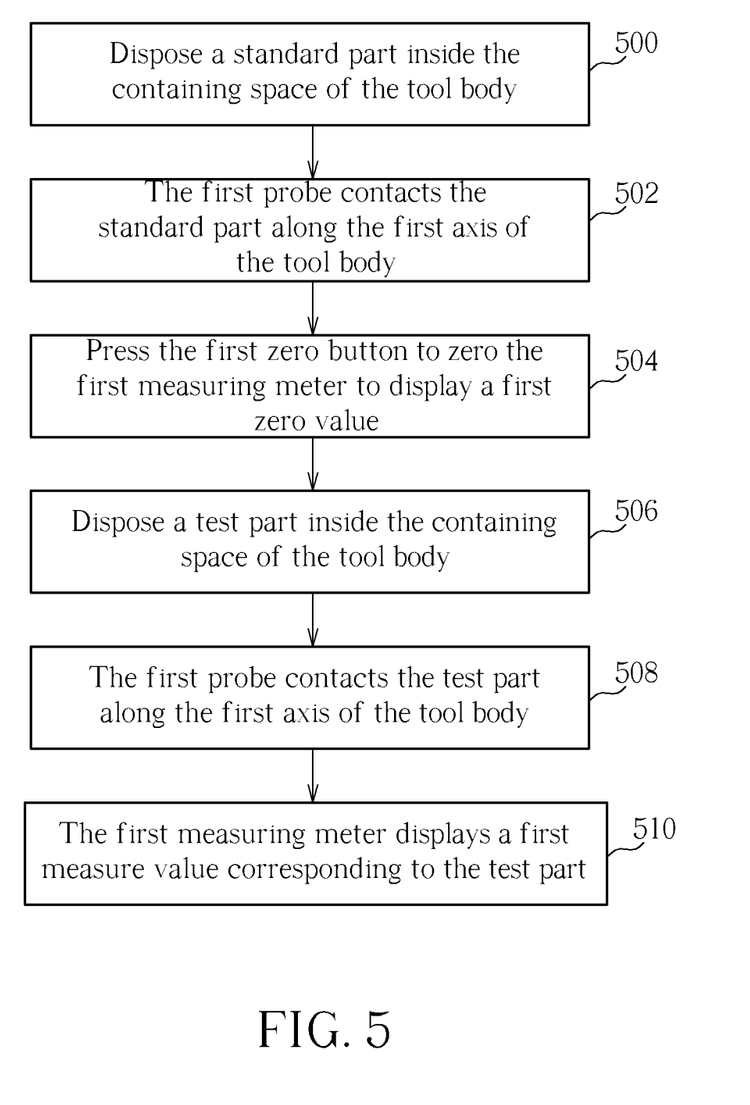
FIG. 5 is a flowchart of a measuring method for utilizing the measuring tool in FIG. 1 to measure a dimension difference value of a standard part and a test part in a first axis of a tool body according to an embodiment of the present invention.

Step 500: Dispose a standard part inside the containing space 21 of the tool body 12;

Step 502: The first probe 24 contacts the standard part along the first axis of the tool body 12;

Step 504: Press the first zero button 28 to zero the first measuring meter 26 to display the first zero value;

Step 506: Dispose a test part inside the containing space 21 of the tool body 12;

Step 508: The first probe 24 contacts the test part along the first axis of the tool body 12;

Step 510: The first measuring meter 26 displays the first measure value corresponding to the test part.

As shown in FIG. 4, a standard part 42 is disposed inside the containing space 21 (Step 500), and then the first probe 24 contacts the standard part 42 (Step 502) along the first axis of the tool body 12 (i.e. the X-axis in FIG. 4) after the standard part 42 abuts against the right-side wall of the containing space 21. At the same time, the first measuring meter 26 can be zeroed by pressing the first zero button 28 (Step 504) so as to display the first zero value. Display of the first zero value on the first measuring meter 26 can be, for example, as shown in FIG. 6, which is a front view of the first measuring meter 26 in FIG. 4.

Figure 6:
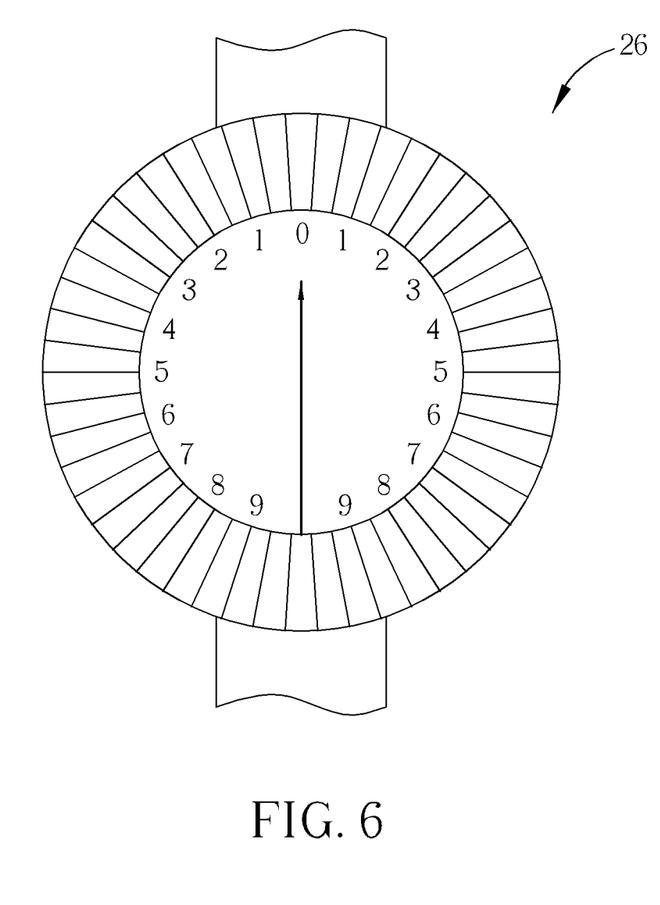
FIG. 6 is a front view of a first measuring meter in FIG. 4.

As shown in FIG. 6, when the first zero button 28 is pressed to zero the first measuring meter 26, the pointer of the first measuring meter 26 indicates the reading "0", which can be regarded as the first zero value. Accordingly, via the zeroing operation of the first zero button 28, the position where the first probe 24 contacts the standard part 42 can be utilized as a basis for measuring a dimension difference value of the standard part 42 and a test part. In other words, no matter a size of the test part is greater or less than the size of the standard part 42, the dimension difference value of the test part and the standard part 42 relative to the first axis of the tool body 12 can measured based on the leftward or rightward deflection of the pointer of the first measuring meter 26 driven by the first probe 24 relative to the first zero value. In this embodiment, the rightward deflection of the pointer of the first measuring meter 26 relative to the first zero value means that the size of the test part is greater than that of the standard part 42, and the leftward deflection of the pointer of the first measuring meter 26 relative to the first zero value means that the size of the test part is less than that of the standard part 42.

Figure 7:
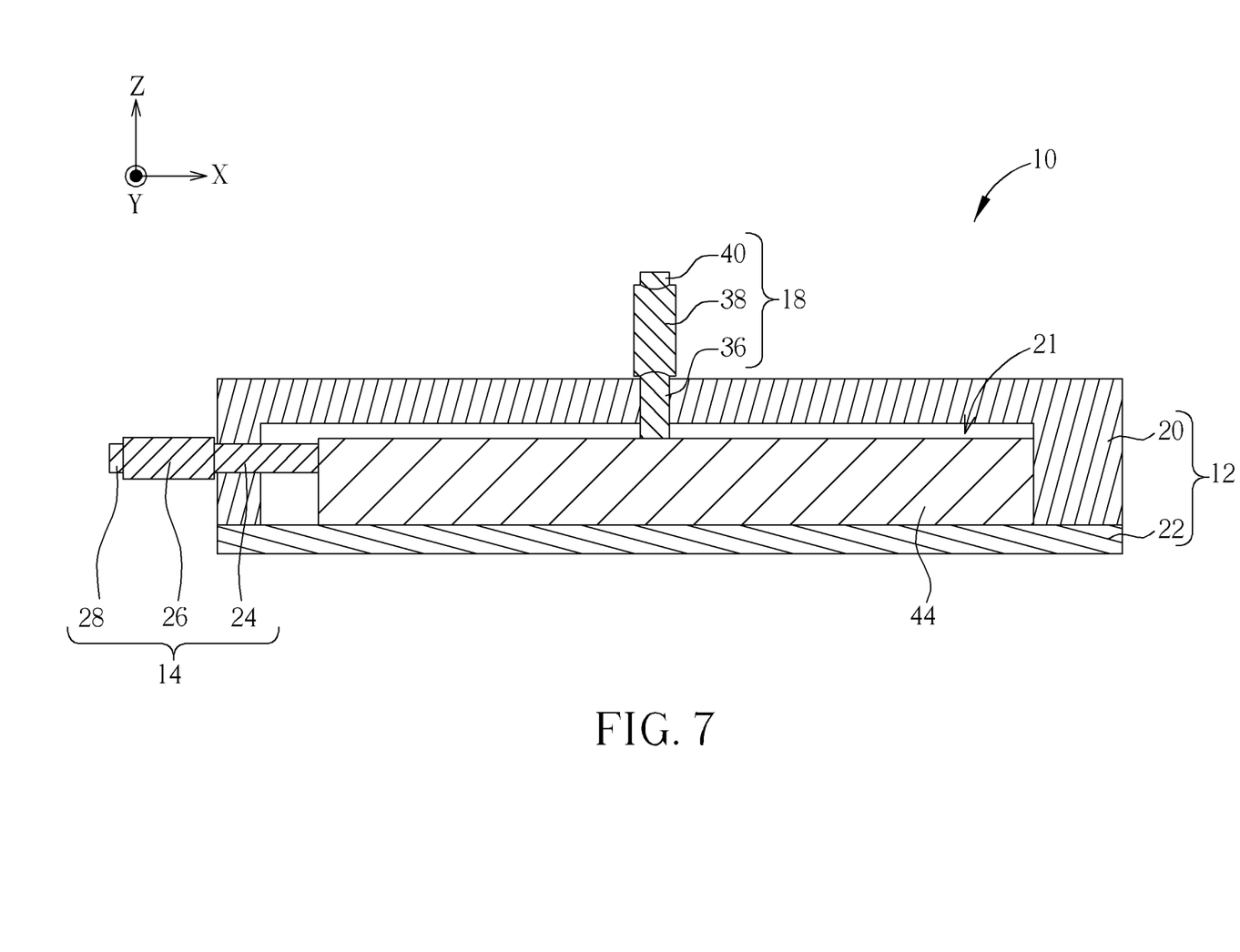
FIG. 7 is a sectional side-view of a first probe in FIG. 4 contacting a test part.

Please refer to FIG. 4 and FIG. 7. FIG. 7 is a sectional side-view of the first probe 24 in FIG. 4 contacting a test part 44. After the said zeroing operation is completed and the standard part 42 in FIG. 4 is taken out of the tool body 12, the test part 44 is disposed inside the containing space 21 (Step 506). Subsequently, after the test part 44 abuts against the right-side wall of the containing space 21 (as shown in FIG. 7), the first probe 24 contacts the test part 44 along the first axis of the tool body 12 (Step 508).

In this embodiment, it is assumed that the size of the test part 44 in the first axis of the tool body 12 is less than that of the standard part 42. Thus, the first probe 24 is extended from the position as shown in FIG. 4 to the position as shown in FIG. 7 to contact the test part 44, so that the pointer of the first measuring meter 26 can be deflected leftward from the position of the reading "0" to indicate the first measure value corresponding to the test part 44 (Step 510). Display of the first measure value on the first measuring meter 26 can be, for example, as shown in FIG. 8, which is a front view of the first measuring meter 26 in FIG. 7.

Figure 8:
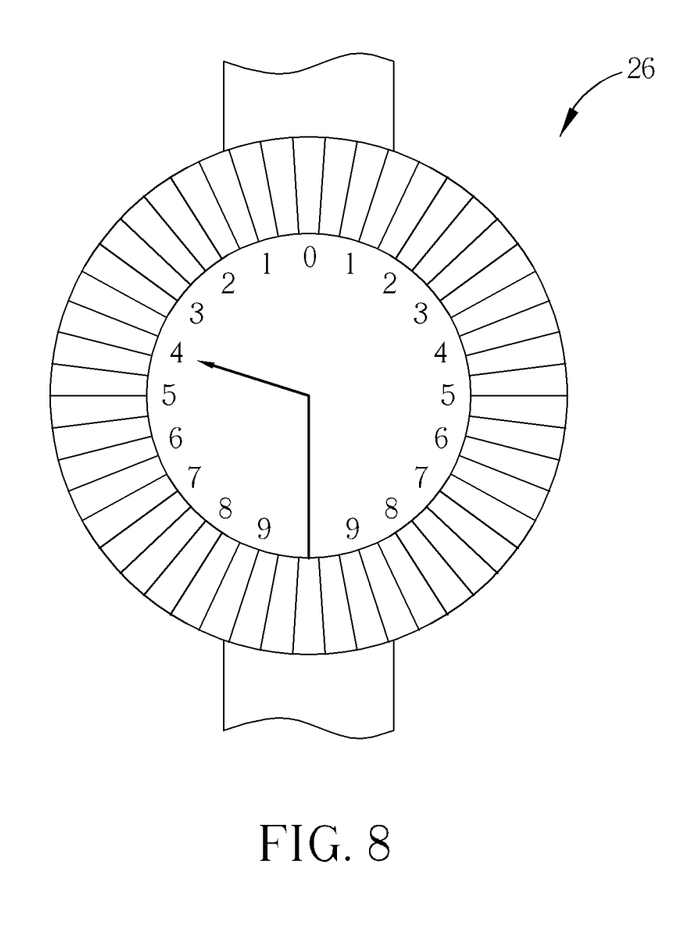
FIG. 8 is a front view of the first measuring meter in FIG. 7.

As shown in FIG. 8, the pointer of the first measuring meter 26 is deflected leftward to indicate the reading "4", which is regarded as the first measure value. Accordingly, a first dimension difference value of the test part 44 and the standard part 42 in the first axis of the tool body 12 can be calculated based on a difference value of the first measure value and the first zero value. In other words, in this case, the unit difference of the sizes of the test part 44 and the standard part 42 in the first axis of the tool body 12 is equal to 4. The unit of length utilized in the first measuring meter 26 varies with the practical application of the measuring tool 10. For example, if the unit of length utilized in the first measuring meter 26 is 0.01 mm, it means that the length difference of the test part 44 and the standard part 42 in the first axis of the tool body 12 is equal to 0.04 mm. In such a manner, the first dimension difference value of the test part 44 and the standard part 42 can be calculated precisely.

Similarly, the second dimension difference value of the test part 44 and the standard part 42 in the second axis of the tool body 12 (i.e. the Y-axis in FIG. 7) and the third dimension difference value of the test part 44 and the standard part 42 in the third axis of the tool body 12 (i.e. the Z-axis in FIG. 7) can also be calculated by performing the said steps. In brief, for measurement of the test part 44 in the second axis, the second zero value can be displayed by the second measuring meter 32 after the second probe 30 contacts the standard part 42 in the second axis and then the second zero button 34 zeros the second measuring meter 32, and subsequently, the second measure value can be displayed by the second measuring meter 32 when the second probe 30 contacts the test part 44 in the second axis. Accordingly, the second dimension difference value of the test part 44 and the standard part 42 in the second axis can be calculated based on a difference value of the second measure value and the second zero value.

Furthermore, for measurement of the test part 44 in the third axis, the third zero value can be displayed by the third measuring meter 38 after the third probe 36 contacts the standard part 42 in the third axis and then the third zero button 40 zeros the third measuring meter 38, and subsequently, the third measure value can be displayed by the third measuring meter 38 when the third probe 36 contacts the test part 44 in the third axis. Accordingly, the third dimension difference value of the test part 44 and the standard part 42 in the third axis can be calculated based on a difference value of the third measure value and the third zero value.

In summary, according to the first dimension difference value, the second dimension difference value, and the third dimension difference value, the measuring tool of the present invention can precisely determine whether the overall size of the test part 44 fits a predetermined size.

It should be mentioned that the design that the measuring tool 10 displays the readings is not limited to the said analog display manner, meaning that the present invention can also utilize other display design, such as displaying the readings in a digital display manner. Furthermore, the second measuring unit 16 and the third measuring unit 18 can be an omissible component for simplifying the mechanical design of the measuring tool 10. For example, the measuring tool 10 can just have the first measuring meter 14 disposed thereon so that the measuring tool 10 can only measure a dimension difference value of a standard part and a test part in one single axis; otherwise, the measuring tool 10 can have the second measuring unit 16 and the third measuring unit 18 disposed thereon so that the measuring tool 10 can measure dimension difference values of a standard part and a test part in two axes.

Compared with the prior art, the present invention utilizes the measuring unit disposed on the tool body capable of containing a standard part or a test part, to display a zero value when the probe contacts the standard part and then display a measure value when the probe contacts the test part. Accordingly, a dimension difference value of the test part and the standard part can be calculated based on the difference value of the measure value and the zero value. In such a manner, the measuring tool provided by the present invention can precisely determine whether the size of the test part fits the size of the standard part. Furthermore, since there is no need to utilize an additional measuring tool, the present invention can also avoid a time-consuming and strenuous measuring process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A measuring tool for measuring a dimension difference value of
    a standard part and a test part, the measuring tool comprising:
    a tool body having a containing space for containing the standard part or the test part; and
    a first measuring unit disposed at the tool body corresponding to a first axis, the first measuring unit comprising:
        a first probe protruding inward relative to the containing space and movable elastically along the first axis, for contacting the standard part when the standard part is disposed inside the tool body and for contacting the test part when the test part is disposed inside the tool body;
        a first measuring meter connected to the first probe for displaying a first zero value or a first measure value corresponding to the test part; and
        a first zero button disposed on the first measuring meter for zeroing the first measuring meter to display the first zero value when the first probe contacts the standard part;
    wherein the first measuring meter displays the first measure value when the first probe contacts the test part after the first zero button zeros the first measuring meter, and a first dimension difference value of the test part and the standard part in the first axis is equal to a difference value of the first measure value and the first zero value.

2. The measuring tool of the claim 1, wherein the first measuring meter displays the first zero value and the first measure value in an analog display or a digital display manner.

3. The measuring tool of the claim 1, wherein the first axis corresponds to an X-axis of the tool body.

4. The measuring tool of the claim 1 further comprising:
    a second measuring unit disposed at the tool body corresponding to a second axis, the second measuring unit comprising:
        a second probe protruding inward relative to the containing space and movable elastically along the second axis, for contacting the standard part when the standard part is disposed inside the tool body and for contacting the test part when the test part is disposed inside the tool body;
        a second measuring meter connected to the second probe for displaying a second zero value or a second measure value corresponding to the test part; and
        a second zero button disposed on the second measuring meter for zeroing the second measuring meter to display the second zero value when the second probe contacts the standard part;
    wherein the second measuring meter displays the second measure value when the second probe contacts the test part after the second zero button zeros the second measuring meter, and a second dimension difference value of the test part and the standard part in the second axis is equal to a difference value of the second measure value and the second zero value.

5. The measuring tool of the claim 4, wherein the second axis corresponds to a Y-axis of the tool body.

6. The measuring tool of the claim 4 further comprising:
    a third measuring unit disposed at the tool body corresponding to a third axis, the third measuring unit comprising:
        a third probe protruding inward relative to the containing space and movable elastically along the third axis, for contacting the standard part when the standard part is disposed inside the tool body and for contacting the test part when the test part is disposed inside the tool body;
        a third measuring meter connected to the third probe for displaying a third zero value or a third measure value corresponding to the test part; and
        a third zero button disposed on the third measuring meter for zeroing the third measuring meter to display the third zero value when the third probe contacts the standard part;
    wherein the third measuring meter displays the third measure value when the third probe contacts the test part after the third zero button zeros the third measuring meter, and a third dimension difference value of the test part and the standard part at the third axis is equal to a difference value of the third measure value and the third zero value.

7. The measuring tool of the claim 6, wherein the third axis corresponds to a Z-axis of the tool body.

8. The measuring tool of the claim 6, wherein the tool body comprises:
    an upper cover; and
    a lower cover pivotally connected to a side of the upper cover for forming the containing space cooperatively with the upper cover.

9. The measuring tool of the claim 8, wherein the first measuring unit and the third measuring unit are disposed at the upper cover corresponding to the first axis and the third axis respectively, and the second measuring unit is disposed at the lower cover corresponding to the second axis.

10. The measuring tool of the claim 1, wherein the tool body comprises:
    an upper cover; and
    a lower cover pivotally connected to a side of the upper cover for forming the containing space cooperatively with the upper cover.

11. A measuring method for utilizing a measuring tool to measure a dimension difference value of a standard part and a test part, the measure tool comprising a tool body and a first measuring unit, the tool body having a containing space for containing the standard part or the test part, the first measuring unit being disposed at the tool body corresponding to a first axis, the measuring method comprising:
    disposing the standard part inside the containing space;
    contacting the standard part by the first measuring unit along the first axis;
    displaying a first zero value by the first measuring unit after being zeroed;
    disposing the test part inside the containing space; and contacting the test part by the first measuring unit along the first axis for displaying a first measure value corresponding to the test part;

wherein a first dimension difference value of the test part and the standard part at the first axis is equal to a difference value of the first measure value and the first zero value.

12. The measuring method of the claim 11, wherein the measuring tool further comprises a second measuring unit disposed at the tool body corresponding to a second axis, and the measuring method further comprises:

contacting the standard part by the second measuring unit along the second axis;

displaying a second zero value by the second measuring unit after being zeroed; and contacting the test part by the second measuring unit along the second axis for displaying a second measure value corresponding to the test part;

wherein a second dimension difference value of the test part and the standard part at the second axis is equal to a difference value of the second measure value and the second zero value.

13. The measuring method of the claim 12, wherein the measuring tool further comprises a third measuring unit disposed at the tool body corresponding to a third axis, and the measuring method further comprises:

contacting the standard part by the third measuring unit along the third axis;

displaying a third zero value by the third measuring unit after being zeroed; and contacting the test part by the third measuring unit along the third axis for displaying a third measure value corresponding to the test part;

wherein a third dimension difference value of the test part and the standard part at the third axis is equal to a difference value of the third measure value and the third zero value.

* * * * *